(12) United States Patent
Yan et al.

(10) Patent No.: US 9,659,319 B2
(45) Date of Patent: May 23, 2017

(54) METHOD, MEDIUM, AND SYSTEM FOR PROCESSING RESOURCE RETURNS

(71) Applicant: Alibaba Group Holding Limited, Grand Cayman (KY)

(72) Inventors: Shunping Yan, Hangzhou (CN); Qiu Lin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 880 days.

(21) Appl. No.: 14/056,262

(22) Filed: Oct. 17, 2013

(65) Prior Publication Data

US 2014/0114786 A1    Apr. 24, 2014

(30) Foreign Application Priority Data

Oct. 19, 2012    (CN) .......................... 2012 1 0401581

(51) Int. Cl.
| | | |
|---|---|---|
| G06Q 30/00 | (2012.01) | |
| G06Q 30/06 | (2012.01) | |
| G06Q 20/12 | (2012.01) | |
| G06Q 20/02 | (2012.01) | |
| G06Q 20/40 | (2012.01) | |

(52) U.S. Cl.
CPC ......... *G06Q 30/0601* (2013.01); *G06Q 20/02* (2013.01); *G06Q 20/12* (2013.01); *G06Q 20/405* (2013.01); *G06Q 20/4016* (2013.01)

(58) Field of Classification Search
CPC ........... G06Q 10/0635; G06Q 20/4016; G06Q 30/0225; G06Q 30/0248
USPC ....................... 705/7.28, 38, 14.47, 14.26, 35
See application file for complete search history.

(56) References Cited

U.S. PATENT DOCUMENTS

| | | | |
|---|---|---|---|
| 6,085,172 A | 7/2000 | Junger | |
| 7,660,721 B2 | 2/2010 | Williams et al. | |
| 8,156,026 B2 | 4/2012 | Junger et al. | |
| 2002/0019785 A1* | 2/2002 | Whitman ............. | G06Q 10/087 705/28 |
| 2002/0052846 A1* | 5/2002 | Takatsu .................. | G06Q 20/06 705/44 |

(Continued)

FOREIGN PATENT DOCUMENTS

| | | |
|---|---|---|
| CN | 102339445 | 2/2012 |
| WO | WO2012012186 | 1/2012 |

OTHER PUBLICATIONS

May 2012—http://web.archive.org/web/20120518053136/http://wiki.usaepay.com/_media/downloads/rs_guide.pdf.*

(Continued)

*Primary Examiner* — Matthew Zimmerman
(74) *Attorney, Agent, or Firm* — Lee & Hayes, PLLC

(57) ABSTRACT

The present disclosure provides a method and an apparatus for processing resource returning. According to the method, as a first user requests for a return of a resource associated with a prior online trade, a trading server determines if the first user has a user rating greater or equal to a preset user rating threshold, and if yes, returns the requested online trading resource to the first user without waiting until a second user has received the corresponding returned goods or services from the first user. The method can expedite the process of returning resources in online trading, and lightens the system burden caused by the user's frequently refreshing the account to check the resource return status.

19 Claims, 6 Drawing Sheets

(56) References Cited

U.S. PATENT DOCUMENTS

| | | |
|---|---|---|
| 2002/0138361 A1 | 9/2002 | Chen |
| 2003/0110088 A1 | 6/2003 | Starmer et al. |
| 2004/0054619 A1* | 3/2004 | Watson .................. G06Q 10/10 705/38 |
| 2004/0210493 A1 | 10/2004 | Sherman et al. |
| 2008/0249788 A1* | 10/2008 | Heller .................... G06Q 40/06 705/1.1 |
| 2011/0060456 A1* | 3/2011 | Lowe ..................... G06Q 10/06 700/237 |
| 2011/0191200 A1* | 8/2011 | Bayer .................... G06Q 20/12 705/26.1 |
| 2011/0276430 A1 | 11/2011 | Vyas et al. |
| 2011/0295756 A1 | 12/2011 | Drew et al. |
| 2012/0226613 A1 | 9/2012 | Adjaoute |

OTHER PUBLICATIONS

PCT Search Report and Written Opinion mailed Apr. 23, 2014 for PCT Application No. PCT/US13/65397, 11 Pages.
CN Office Action mailed May 20, 2016, for corresponding Chinese Patent Application No. 201210401581.0, 21 pages.

\* cited by examiner

METHOD, MEDIUM, AND SYSTEM FOR PROCESSING RESOURCE RETURNS

RELATED PATENT APPLICATIONS

This application claims foreign priority to Chinese Patent Application No. 201210401581.0 filed on Oct. 19, 2012, entitled "Method and Apparatus of Processing Returned Resources", Chinese Patent Application is hereby incorporated by reference in its entirety.

TECHNICAL FIELD

The present invention relates to a field of Internet data processing, and particularly relates to methods and systems of processing resource returns.

BACKGROUND

Current electronic payment for online transactions generally include payments and refunds.

For buyers, electronic payment generally involves advance payment actions. For example, upon purchasing a product online, the buyer makes a payment to a trading server in advance. After receiving the product shipped by the seller, the buyer sends a delivery confirmation to the trading server, which forwards the payment to the seller.

In comparison, electronic refund generally involves back payment actions. For example, if the buyer wants a refund after having received the purchased product, the buyer submits a request for refund and returns the product to the seller. Upon receiving the returned product from the buyer, if the seller accepts the refund request, the seller sends a message to the trading server to confirm the refund, and the trading server then refunds the buyer by making an equivalent payment, or by reversing the original payment. On some popular online trading platforms, to make a refund, the trading server returns, from a system account to the buyer, the payment made in advance by the buyer and temporarily stored in the system account.

In the above described refund process, because the seller must first receive the returned product before accepting the refund request, a delay is caused by return shipping. As a result, buyers frequently inquire their accounts to check the status of the refund. This results in frequent refreshing of the user account information, and causes an increased burden on the system's processing resources.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure provides a method and an apparatus for processing resource returns involved in online trading such as online shopping. The method and the system are designed to solve issues in the prior art techniques which may result in constant account refreshing by the buyers to check refund status and consequent excessive occupation of system processing resources.

One embodiment is a method for processing resource returns. According to the method, a trading server receives a request from a first user for a preferential return of a trading resource associated with a prior online trade; acquires user information of the first user and determines a user rating of the first user based on the acquired user information; and determines whether a user condition of the first user meets a preset user condition criterion. For this purpose, the trading server at least determines if the user rating is greater than or equal to the preset user rating threshold. If the user condition meets the preset user condition criterion, the trading server returns to the first user the trading resource according to the request.

Another embodiment provides a computer-based apparatus for processing online transactions. The apparatus includes a server computer having a processor, computer-readable memory and storage medium, and I/O devices. The server computer is programmed to have functional modules including a receiving module, an acquiring module, a first determining module, a comparison module and a payment module. The receiving module is configured to receive from a first user a request for a preferential return of a trading resource associated with a prior online trade; the acquiring module is configured to obtain user information of the first user; the first determining module is configured to determine a user rating of the first user based on the acquired user information; the comparison module is configured to determine whether a user condition of the first user meets a preset user condition criterion, where the comparison module determines at least if the user rating is greater than or equal to the preset user rating threshold; and the payment module is configured to disburse to the first user the trading resource according to the request if the user condition meets the preset user condition criterion.

Another embodiment provides one or more non-transitory computer-readable storage medium storing executable instructions that, when executed by one or more processors, cause the one or more processors to perform the following acts: receiving, at a trading server, a request from a first user for a preferential return of a trading resource associated with a prior online trade; acquiring user information of the first user and determining a user rating of the first user based on the acquired user information; determining whether a user condition of the first user meets a preset user condition criterion, wherein the determining includes at least determining if the user rating is greater than or equal to the preset user rating threshold; and returning to the first user the trading resource according to the request if the user condition meets the preset user condition criterion.

The method and the system provided by the present disclosure can accelerate the process of returning resources in online trading, and lightens the system burden caused by the first user's frequent account refreshing for checking the resource return status. For example, if the return of the goods or services is delayed during the shipping, the buyer (the first user) does not need to repeatedly inquire the status of the refund by the seller (the second user) to cause an increased burden on the system.

Other features of the present disclosure and advantages will be set forth in the following description, and in part will become apparent from the description, or understood by practice of the application. Purposes of this application and other advantages can be obtained by the written description, claims, and drawings of the structure particularly pointed out realized and attained.

DETAILED DESCRIPTION

In order to facilitate understanding of the above purpose, characteristics and advantages of the present disclosure, the present disclosure is described in further detail in conjunction with accompanying figures and example embodiments. In the description, the term "technique(s)," for instance, may refer to method, apparatus device, system, and/or computer-readable instructions as permitted by the context above and throughout the present disclosure.

In the prior art, after an online trade (such as shopping) has occurred between the first user as a buyer and the second user as a seller, and the first user subsequently requests for a resource return (such as a refund of payment made to purchase a product), the second user may only agree to the request after the counterpart resource (such as the product purchased) has been returned from the first user. Because shipping of the returned product causes a delay, this refund process results in the situation where buyers may frequently check the buyer's account to find out the status of the refund, causing frequent user account refreshing that results in an excessive burden on the system's processing resources. To solve this problem, the present disclosure provides a method for processing resource returns without requiring waiting for the seller to receive the shipped returned counterpart resource (such as a purchased product). In one embodiment, as a first user requests for a return of a resource associated with a prior online trade, and a trading server determines if the first user has a user rating greater or equal to a preset user rating threshold, and if yes, returns the requested online trading resource to the first user without waiting until a second user has received the corresponding returned goods or services from the first user and has subsequently provided a confirmation for returning the requested resource. The method can accelerate the process of returning resources in online trading, and lightens the system burden caused by the first user's frequently refreshing the account to check the resource return status.

Hereinafter, the techniques provided by the present disclosure are described in detail. In this description, the order in which a process is described is not intended to be construed as a limitation, and any number of the described process blocks may be combined in any order to implement the method, or an alternate method.

Figure 1:
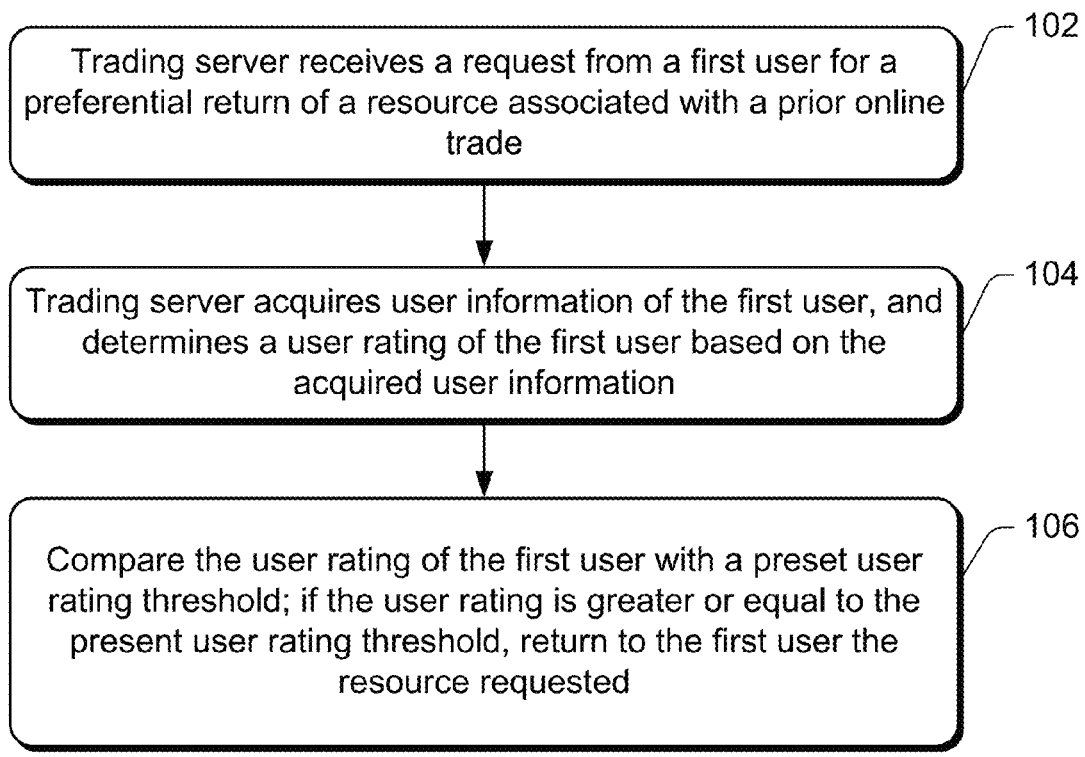
FIG. 1 is a flowchart of a method for processing resource returns in accordance with the present disclosure.

FIG. 1 illustrates an embodiment of the present disclosure using a flowchart of a processing method.

Figure 5:
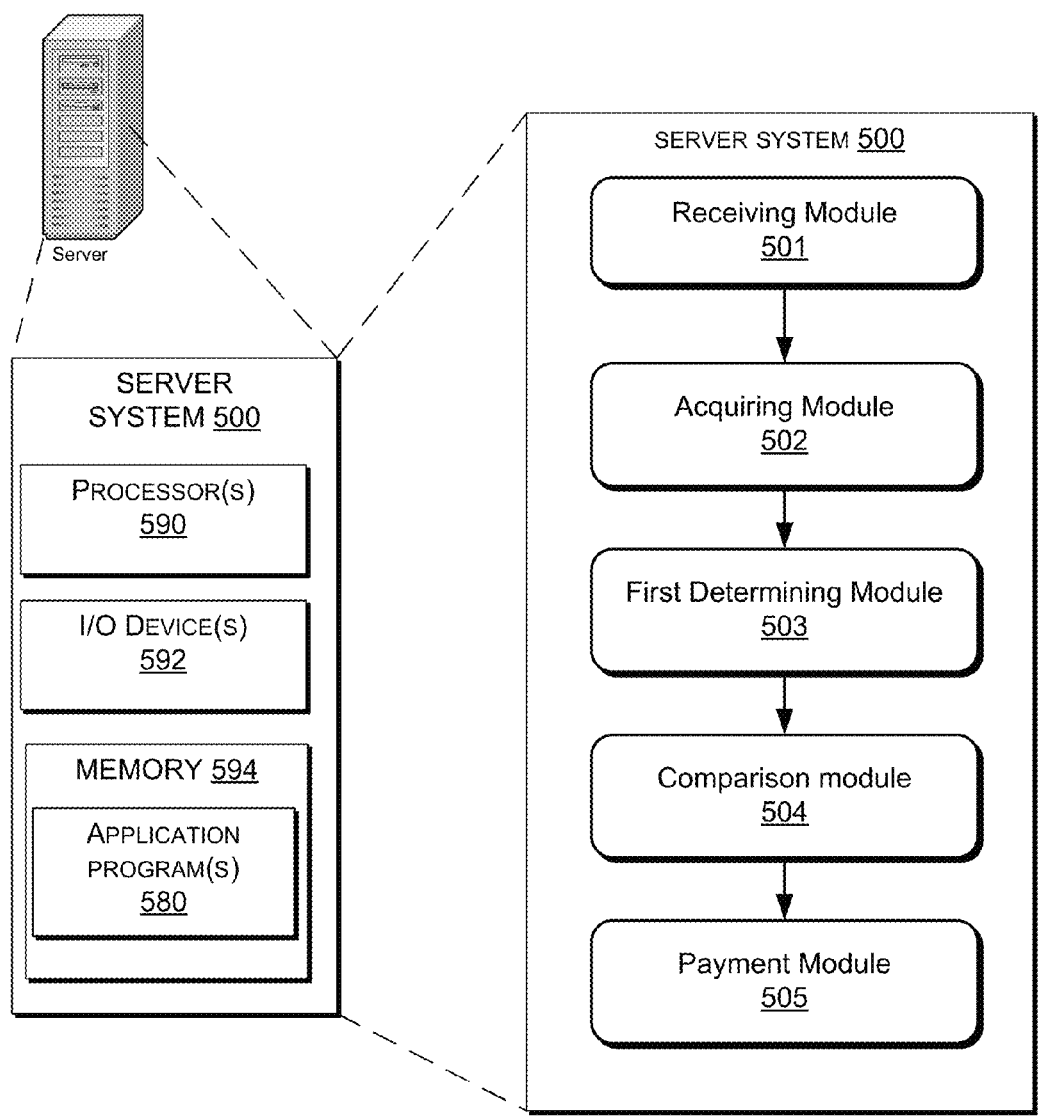
FIG. 5 is a structural diagram of a computer-based apparatus for processing resource returns in accordance with the present disclosure.
Figure 6:
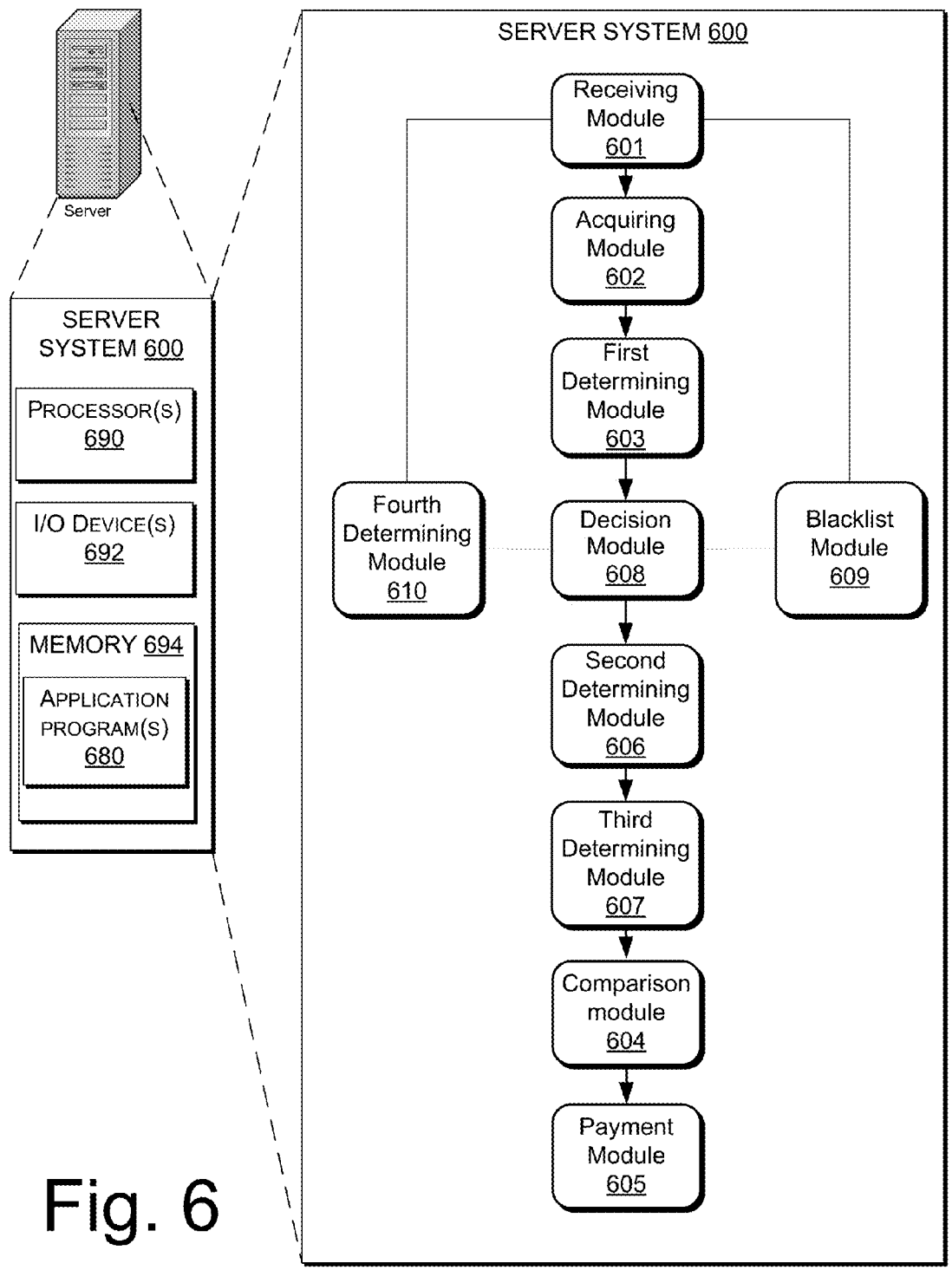
FIG. 6 is a structural diagram of an embodiment of the computer-based apparatus for processing resource returns in accordance with the present disclosure.

At block 102, the trading server, which may be a computer-based system 500 or 600 illustrated in FIG. 5 and FIG. 6, receives a request for the return of a resource associated with a prior online trade. As described herein, the request may be treated as a preferential request which undergoes an expedited process compared to the regular process, if certain conditions are met.

In the present disclosure, the request for return of a resource made by the first user is made in connection with a prior online trade which has taken place previously between the first user and a second user. The subject of such online trade may be a tangible object such as a physical product, but may also be in intangible object such as a service, and the resource that is requested to be returned by the first user may be money (as in a previously made payment), a point card, a token, a credit, or even an occupied service.

Based on the request for a preferential return of the resource, the trading server determines a user identifier of the first user and the resource associated with the prior online trade as requested. This can be determined in two alternative ways.

In a first alternative, the request for preferential return of the resource submitted by the first user may carry a transaction identifier (such as serial number) which uniquely identifies the online trade. The trading server uses the transaction identifier to obtain stored detailed information of the online trade, including the use identifier of the first user, and the traded resources involved in the online trade.

In a second alternative, the first user may use an application client to submit the request. The application client may use the locally recorded detailed transaction information of the online trade identified by the resource return request to determine the traded resources of the online trade, and include the traded resources, the use identifier of the first user and the transaction identifier of the online trade in the request for resource return. Upon receiving the request, the trade server may extract the use identifier of the first user and the descriptions and values of traded resources of the online trade.

At block 104, the trading server acquires user information of the first user, and determines the user rating of the first user based on the user information.

More specifically, the trading server may obtain the user information of the first user based on the use identifier of the first user. The user information may include a variety of network behavior parameters of the user or other user parameters. For example, network behavior parameters may include online shopping records, records of complaints filed against the user, records of resource returning, etc. Other user parameters may include user categories, user reviews, and records of fraudulent online acts. It is appreciated that, as the application scenario changes, the user information may include additional parameters.

The act of determining the user rating of the first user may include: quantifying a score of each type of behavior parameter using predetermined quantization levels; obtaining a weighted value of each score by multiplying the score with a respective weight factor corresponding to the type of behavior parameter; and computing the user rating by summing up the weighted values of the scores in the behavior parameters. A quantized score may be either apostate score or negative. The weight factors corresponding to each type of behavior parameter may be predetermined.

For example, suppose the predetermined quantization levels are 1-100. After quantization, among the network behavior parameters, online shopping records, records of complaints, records of resource returning, receive scores 20, −10, and 30, respectively, while among the other user parameters, user category, user review, and records of fraudulent online acts, receive scores 30, 10, and 10, respectively. If the weight factors of the above parameters are all the same such as "1", then the weighted value of each parameter is the same as the score the parameter received above. Summing up the weighted values of all above parameters gives a user rating of 90.

The act of determining the user rating of the first user may be carried out prior to block 102. This way, as long as the request for resource return carries the use identifier of the first user, the trading server may directly obtain the predetermined user rating of the first user based on the use identifier to increase the speed of the resource return processing.

Block 106 compares the user rating of the first user with a preset user rating threshold. The trading server preferentially returns the requested resource to the first user if the user rating of the first user is greater or equal to the present user rating threshold.

Figure 2:
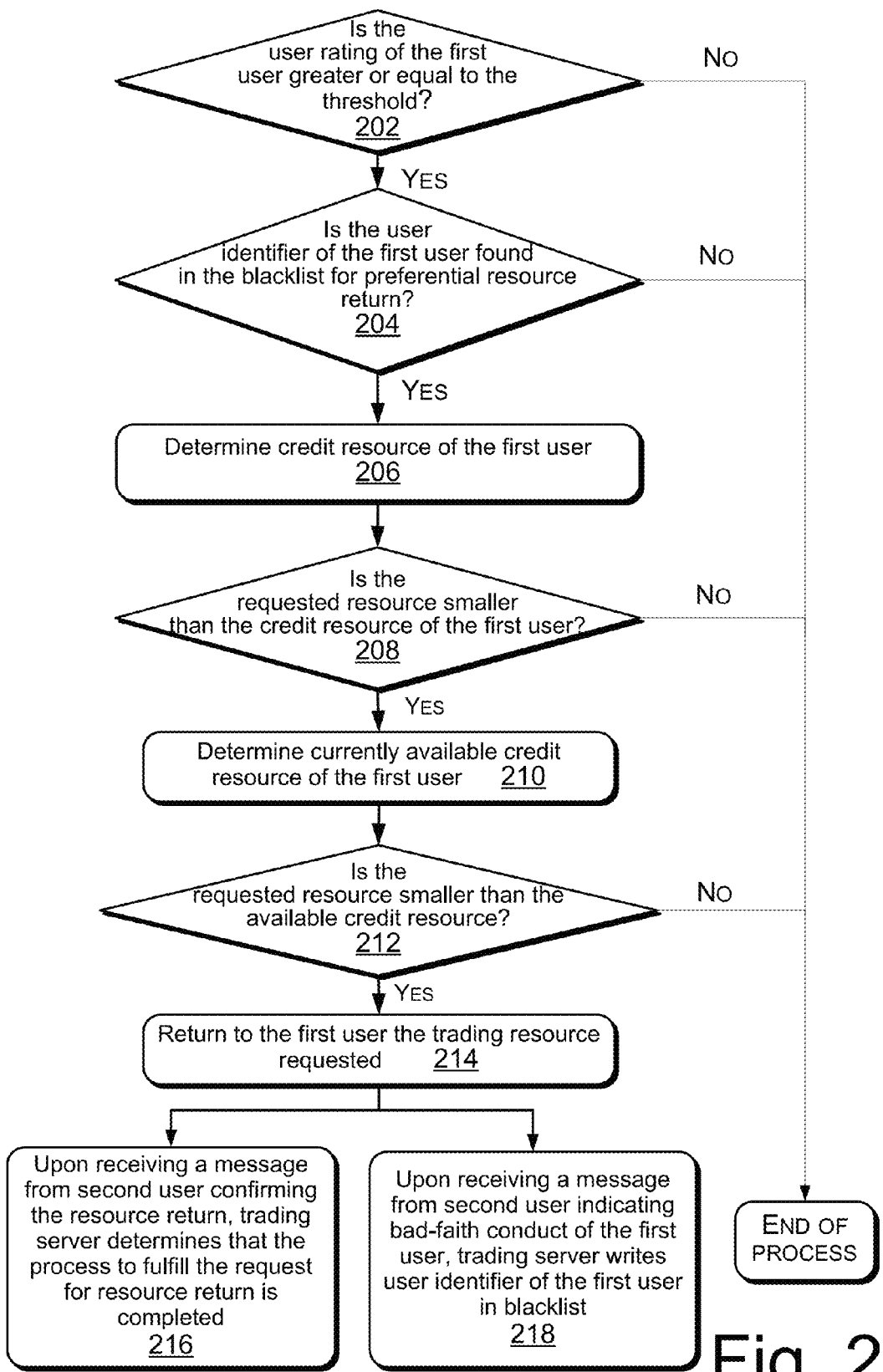
FIG. 2 is a flowchart of a detailed procedure according to Block 106 of FIG. 1.

FIG. 2 illustrates details of an example process of block 106. The illustrated process in FIG. 2 includes blocks 202-218. Blocks 202-212 determine whether the requested resource should be returned to the first user. Block 214 is the process of returning the requested resource, while blocks 216 and 218 determine whether the process of returning the requested resource is complete.

It is noted that any one or any combination of the multiple conditions determined in blocks 202-212 (including the comparing and determining steps in block 202, block 204, block 208 and block 212) may be used according to the need in each implementation. As one or a combination of several conditions for determination are used, the process may proceed to the next block 214 if the one or the combination of the several conditions are met. The determination of these conditions are illustrated below.

Block 202 compares the user rating of the first user with a preset user rating threshold. If the user rating of the first user is greater or equal to the preset user rating threshold, the process proceeds to block 204. If not, the process ends.

Continuing with the example described above, if the preset user rating threshold is 50, the first user who has received the user rating of 90 has met the condition determined at block 202 because the user rating of the first user is greater than the threshold.

Block 204 determines whether the use identifier of the first user is found in the blacklist of preferential return of resources. If the use identifier of the first user is not found in the blacklist, the process proceeds to block 206. If the user identifier of the first user is found in the blacklist, the request for preferential return of a resource by the first user is denied, and the process proceeds to an end.

The blacklist of preferential return of resources may be pre-compiled by combining multiple blacklists related to online trading. Such blacklists may include at least one of the following: users whose user parameters indicate a record of committing an online shopping fraud, the blacklist of online payment; a blacklist of online complaints, and a blacklist of online trading misconduct.

Block 206 determines a credit resource of the first user. In one embodiment, the first user is determined, based on its user rating, to be in a certain user rating segment. The first user is then determined to belong to a user category corresponding to the user rating segment, and acquires a credit resource pre-assigned to the user category. This acquired credit resource becomes the credit resource of the first user.

TABLE 1

| User segment | User category | Credit resource assigned to the user category |
|---|---|---|
| Third user segment: 151-200 | VIP 1 | 300 Yuan |
| Second user segment: 101-150 | VIP 2 | 200 Yuan |
| First user segment: 50-100 | VIP 3 | 100 Yuan |

Still with the example described above, suppose there are three user segments based on user ratings, as shown in Table 1 herein. The first user segment includes users whose user ratings fall between 50-100, the second user segment includes users whose user ratings fall between 101-150, while the third user segment includes users whose user ratings fall between 151-200. The first segment corresponds to a user category called VIP 3, the second segment corresponds to a user category called VIP 2, while the third segment corresponds to a user category called VIP 1. User category VIP 1 has a pre-assigned credit resource value of 300 Yuan, user category VIP 2 has a pre-assigned credit resource value of 200 Yuan, while the user category VIP 3 has a pre-assigned credit resource value of 100 Yuan. According to this example of user categories and pre-assigned credit resource values, it can be determined that the first user who has a user rating of 90 belongs to the first user segment, corresponding to a user category VIP 3, and therefore has a corresponding credit resource value of 100 Yuan.

Block 208 determines whether the trading resource of the online trade identified in the request for preferential return of resource is smaller in value than the credit resource of the first user. If yes, the process proceeds to block 210; if not, it indicates that the resource requested to be returned exceeds in value the credit resource of the first user, and allowing preferential or expedited requested return of the resource may bring risks to the online trading site, thus the request for preferential return of resource is denied, and the process proceeds to an end.

Still with the above-described example, if the trading resource of the online trade identified in the request of preferential return of the resource is 50 Yuan, then the value of the resource is smaller than that of the credit resource which is 100 Yuan for the first user.

Block 210 determines a currently available credit resource of the first user. The trading server checks whether there is a pending resource return process which has been initiated prior to submission of the current request for preferential return of resource. If such a pending process exists, the resource associated with the online trading corresponding to the pending process is considered to be an occupied resource, and the currently available credit resource of the first user is determined by subtracting the occupied resource from the credit resource of the first user.

Continuing with the example described above, if a pending request for preferential return of resource of the first user exists and has an occupied resource of 20 Yuan in value, the current available credit resource is determined to be 80 Yuan (100 Yuan−20 Yuan=80 Yuan, where 100 Yuan is value of the credit resource, while 20 Yuan is the occupied resource).

Block 212 determines if the trading value of the online trade identified in the request for preferential return of resource is smaller in value than the currently available credit resource. If the result is yes, the process proceeds to block 214; if not, it indicates that the resource requested to be returned exceeds in value the available credit resource of the first user, and allowing preferential or expedited requested return of the resource may bring risks to the online trading site, thus the request for preferential return of resource is denied, and the process proceeds to an end.

In the above described example, because the return resource, which is the resource requested to be returned by the presently submitted request for preferential return of resource, has a value of 50 Yuan, the return resource is smaller in value than the current available credit resource 80 Yuan, because 50<80.

Block 214 returns to the first user the resource associated with the online trade identified in the request for preferential return of resource submitted by the first user, when conditions described above are met. The return of the resource may comprise an act of making a refund, or making a cancellation or reversal of the payment.

In the above described example, the system makes a payment of 50 Yuan to the first user according to the request for preferential return of resource submitted by the first user.

Payment of the returned resource may be conducted in one of the following two methods.

First example payment method: if the first user and the second user conducted the prior online trade and made payment in the prior online trade on the trading server, the online trading server may make a direct payment to the first user to refund the returned resource. In this payment method, because the same trading server is used for processing both the online trading process and the payment, the process is simplified.

Second example payment method: if the first user and the second user conducted the prior online trade on the trading server, but used a third-party payment platform to make payment in the prior online trade, trading server may send a first instruction of resource return to the third-party payment platform, and include in the first instruction of resource return a transaction identifier of the online trade identified in the request of the preferential return of resource. Upon receiving the first instruction of resource return, the third-party payment platform uses the transaction identifier contained therein to find the account information of the first user and the trading resources of the online trade, and make a payment equivalent to the value of the resource involved in the online trade, from a first account to the account of the first user.

In a practical implementation, the first account may be a system account designated for the purpose of processing requests for preferential return of resources, akin to the function of a guarantee fund, because the system account may guarantee a prompt return of the requested resource (i.e., a refund) without having to wait to receive the payment of the requested resource from the second user. In this payment method, the online trade is conducted by the trading server, while the payment is conducted by a third-party payment platform, and the process has the benefit of better securities for both the online trading and the funds being used in the transaction.

At block 216, upon receiving from the second user a message confirming the preferential return of resource, the trading server determines that the request for preferential return of resource by the first user has been fulfilled and the resource return process completed.

The message confirming the preferential return of resource may include a transaction identifier of the online transaction. If the above first example payment method is used, the online trading server may use the transaction identifier included in the message confirming the preferential return of resource to determine that the requested preferential return of the resource is complete.

If the above second example payment method is used, the trading server may send a second instruction of resource return to the third-party payment platform and include in the second instruction the transaction identifier of the online trade identified in the first instruction of resource return. Upon receiving the second instruction of resource return, the third-party payment platform determines if the transaction identifier included in the second instruction is the same as the transaction identifier included in the first instruction, and if yes, pay from a second account to the first account a resource equivalent in value to the resource associated with the online trade identified by the transaction identifier. The second account may be another system account used for receiving from the first user the payment associated with the online trade. The second account thus may function as an escrow account in which the payment received from the first user (e.g., a buyer) conditionally stays, and payment may be transferred to the first account for the purpose of making a refund without requiring the second user (e.g., a seller) to make a separate payment to cover the refund.

At block 218, the trading server receives from the second user a message indicating that the first user has a record of bad faith conduct, and consequently writes the user identifier of the first user into the blacklist of preferential return of resource.

In the above described process, when the first user needs to request a return of the resource associated with a prior online trade, the trading server returns the requested resource to the account of the first user, if it determines that the user rating of the first user is greater or equal to the preset user rating threshold. When the user rating condition is met, there is no need to wait until the second user has received and confirmed the corresponding returned trading resource (such as a product purchased) before a return payment (such as a refund) can be made to the first user by the trading server. This increases the speed of returning resources associated in online trading, reduces the account refreshing by the first user, and lightens the processing burden on the system.

In an embodiment, the system may determine whether the user identifier of the first user is found in the blacklist barring against a preferential return of resource, and may further determine whether the resource requested to be preferentially returned is smaller in value than the credit resource or the currently available credit resource of the first user, to guarantee the security of the online trading and the funds involved.

Embodiments of the present disclosure will be described in specific applications in the following.

The First Application Scenario

Figure 3:
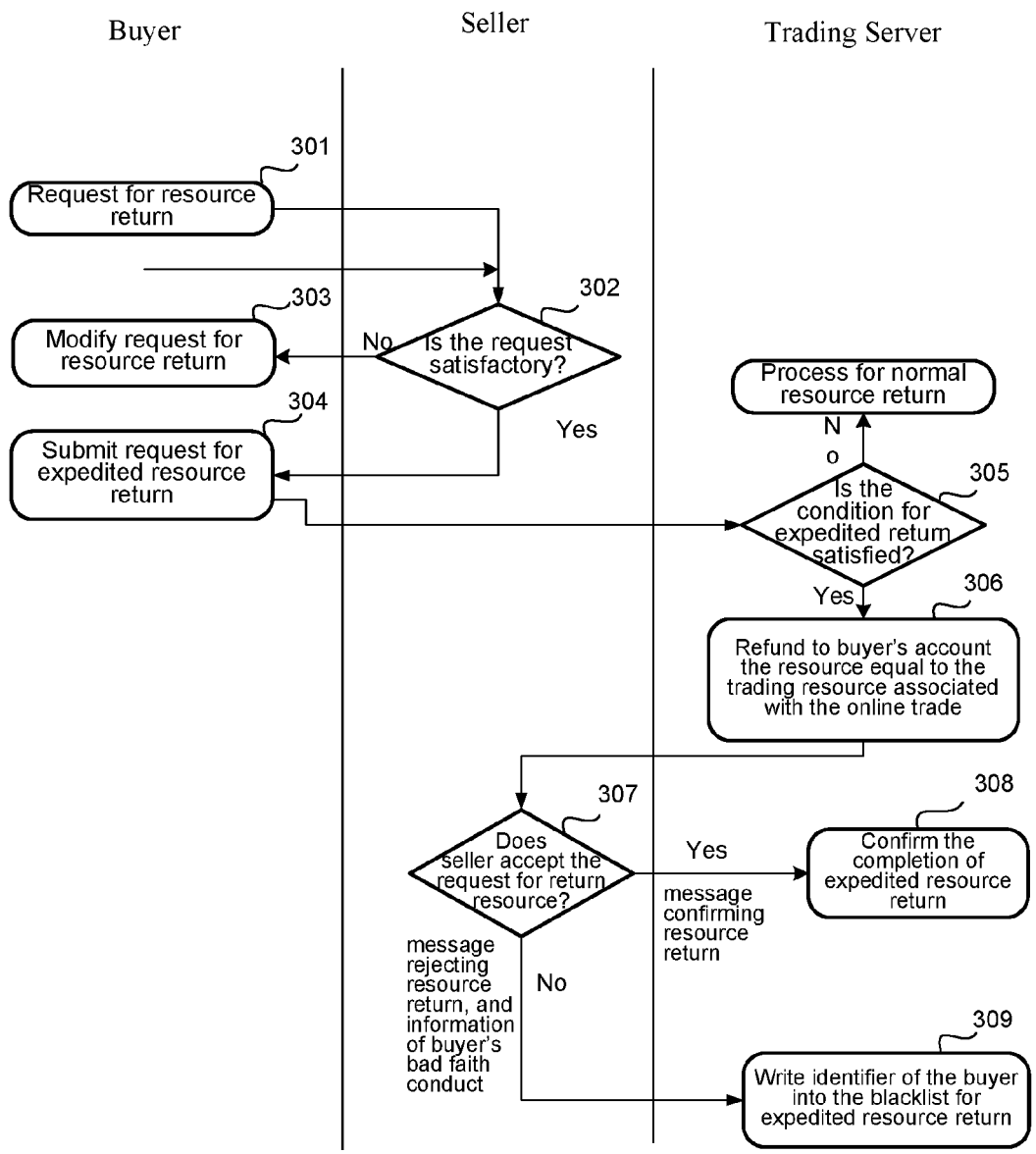
FIG. 3 is a flowchart of an embodiment of the method for processing resource returns in accordance with the present disclosure.

In a first specific application scenario of the present disclosure, the first user is the buyer, and the second user is the seller. The buyer and the seller conducted an online shopping transaction and also made payment on the trading server. The buyer subsequently submits a request for preferential return of resource (i.e., a refund of the payment). The request is processed as illustrated in FIG. 3. In the process, blocks 301-304 are user-side processing procedures, blocks 305 and 306 are procedures of the trading server for returning the requested resource (i.e., refunding the payment) to the buyer, while steps 307-309 are procedures of the trading server for confirming the completion of the resource return. FIG. 3 is divided into three columns, representing the buyer, the seller, and the trading server, respectively. The actions taken on the side of each party are placed in the respective column corresponding to that party.

At block 301, the buyer submits a request to the seller for return of the resource associated with an online shopping transaction happened between the buyer and the seller.

At block 302, the seller processes the buyer's request, proceeds to block 304 if the request is considered satisfactory, but proceeds to block 303 if the request is not satisfactory.

At block 303, the buyer modifies the request according to the seller's feedback, and re-submits the modified request to the seller. The process goes back to block 302.

At block 304, the buyer provides return shipping information and the value of the return resource (refund) requested, and submits a request for expedited resource return, to the trading server. The "request for expedited resource return" is an example of "a request for preferential resource return" disclosed herein. The request for expedited resource return carries a transaction identifier of the prior online trade, which may be a purchase of a product by the buyer from the seller.

At block 305, upon receiving the request for expedited resource return, the trading server determines if the condition for an expedited resource return is satisfied by the buyer and the request. If yes, the process proceeds to block 306; if not, the process enters into a normal resource return.

Specifically, the determination of whether the condition for an expedited resource return is satisfied may be done using the following example process.

Based on the online transaction identifier contained in the request for expedited resource return, the trading server obtains the user identifier and the trading resource of the online transaction. The trading server obtains the user information of the buyer based on the buyer's user identifier, and determines the user rating of the buyer based on the acquired information (using, for example, the procedure in block 104 described in relation to FIG. 1), determines if the conditions for expedited resource return are met by the buyer and the request of the buyer. Such conditions may include: that the user rating of the buyer is greater or equal to a preset user rating threshold; the user identifier of the buyer is not found in the blacklist barring from expedited resource return, which is an example of the blacklist of preferential resource return; and the resource requested to be returned is smaller in value than the buyer's currently available credit resource, which can be determined, for example, using a process described in block 135. If all the required conditions are met, the process proceeds to block 306; if not, the process enters into normal resource return.

At block 306, the trading server returns to the buyer's user account the requested resource (which is money in the present transaction) equivalent in value to the resource associated with the identified online transaction.

At block 307, the seller processes the counterpart resource of the online transaction returned from the buyer. The counterpart resource may be a product purchased by the buyer from the seller in the online transaction. Upon receiving the returned product from the buyer, if the seller agrees to accept the buyer's request for resource return (refund), the seller submits to the trading server a message confirming resource return, and the process proceeds to block 308. But if the seller rejects the buyer's request for resource return due to reasons such as an existence of a record of the buyer's bad-faith conduct in the past, the seller may send to the trading server a message rejecting the request for resource return, and may also include in the message the information of buyer's bad-faith conduct. In this case, the process proceeds to block 309.

At block 308, the trading server receives from the seller the message confirming resource return, and determines that the expedited resource return is complete.

At block 309, upon receiving from the seller a message rejecting resource return along with the information indicating the existence of the buyer's past bad-faith conduct, the trading server writes the user identifier of the buyer into the blacklist barring from expedited resource return, and ends the process.

In the above process, upon receiving the request for expedited resource return from the buyer, the trading server is able to quickly make a refund to the buyer without waiting for the seller to have first received the returned product from the buyer. This results in a more expedited refund process, improves the processing efficiency, and reduces number of user account refreshes and the consequent processing burden on the system.

The Second Application Scenario

Figure 4:
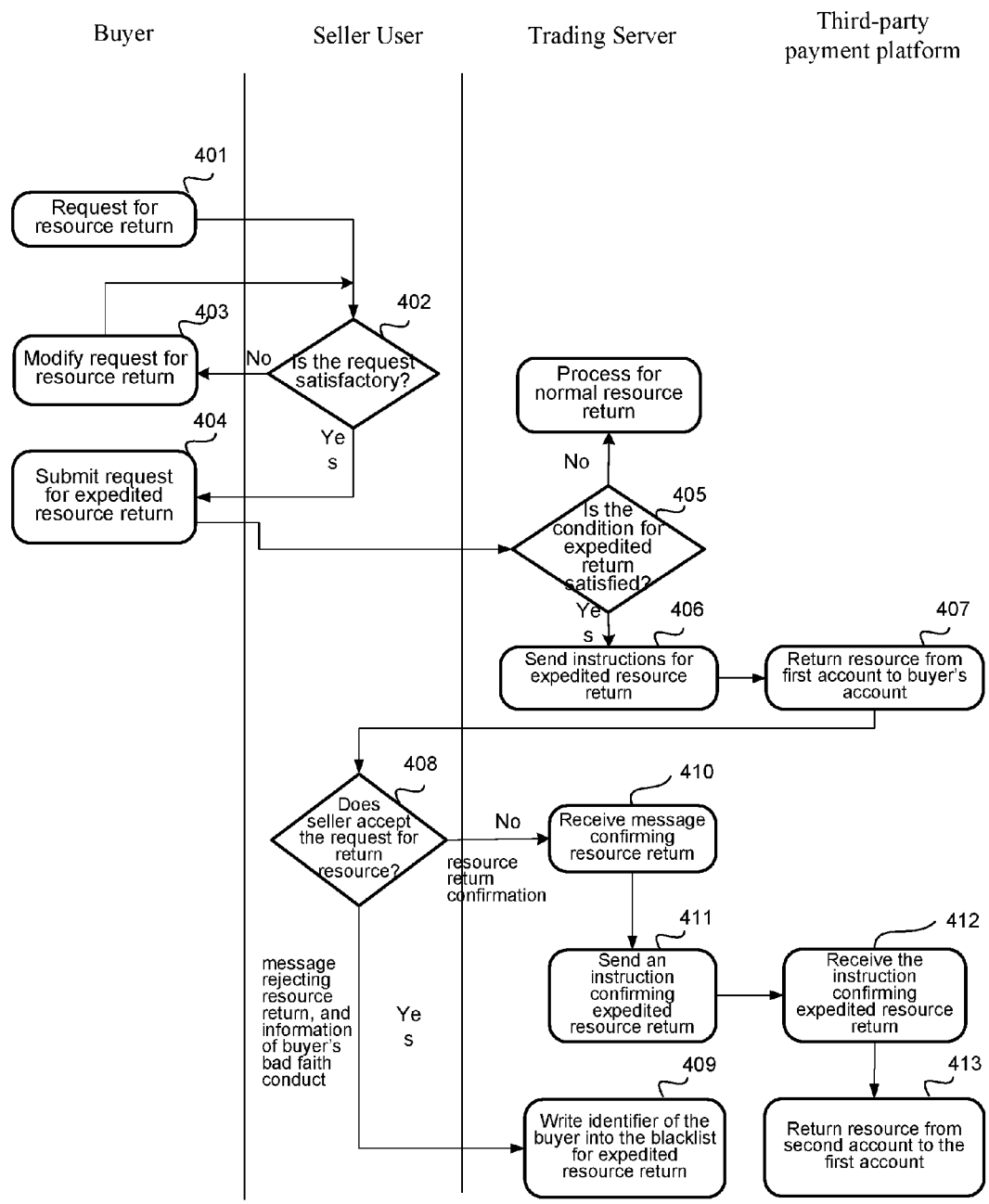
FIG. 4 is a flowchart of another embodiment of the method for processing resource returns in accordance with the present disclosure.

In another example application scenario of the present disclosure, the first user is a buyer, the second user is a seller. The buyer and the seller conducted an online transaction on the trading server, but used a third-party payment platform for payment. The seller subsequently submits a request for preferential resource return, which is processed as illustrated in FIG. 4. In the process described below, blocks 401-404 are user-side procedures, blocks 405-407 are procedures used by the trading server and the third-party payment platform to process the return of the requested resource (refund), while blocks 408-413 are procedures used by the trading server and the third-party payment platform to confirm the completion of the resource return. FIG. 4 is divided into four columns, representing the buyer, the seller, the trading server, and the third-party payment platform, respectively. The actions taken on the side of each party are placed in the respective column corresponding to that party.

At block 401, the buyer submits to the seller a request for resource return.

At block 402, the seller processes the request, and proceeds to block 404 if the request is considered satisfactory, but proceeds to block 403 if the request is considered unsatisfactory.

At block 403, the buyer modifies the request, and re-submit the request, and the process goes back to block 402.

At block 404, the buyer provides return shipping information and the value of return resource (refund) requested, and submits a request for expedited resource return to the trading server. The request for expedited resource return carries a transaction identifier of the prior online trade, which may be a purchase of a product by the buyer from the seller.

At block 405, upon receiving the request for expedited resource return, the trading server determines if the condition for an expedited resource return is satisfied by the buyer and the request. If yes, the process proceeds to block 406; if not, the process enters into a normal resource return.

Specifically, the determination of whether the condition for an expedited resource return is satisfied may be done using the following example process.

Based on the online transaction identifier contained in the request for expedited resource return, the trading server obtains the user identifier and the trading resource of the online transaction. The trading server obtains the user information of the buyer based on the buyer's user identifier, and determines the user rating of the buyer based on the acquired information (using, for example, the procedure in block 104 described in relation to FIG. 1), determines if the conditions for expedited resource return or met by the buyer and the request of the buyer. Such conditions may include: that the user rating of the buyer is greater or equal to a preset user rating threshold; the user identifier of the buyer is not found in the blacklist barring from expedited resource return (an example of the blacklist of preferential resource return); and the requested return resource is smaller in value than the buyer's currently available credit resource (which can be determined, for example, using a process described in block 210). If all the required conditions are met, the process proceeds to block 406; if not, the process enters into normal resource return.

At block 406, the trading server sends the third-party payment platform an instruction for expedited resource return. The instruction includes the transaction identifier of the online transaction identified in the request for preferential resource return.

At block 407, upon receiving the instruction for expedited resource return and the transaction identifier contained therein, the third-party payment platform uses the transaction identifier to find the buyer's user account and the trading resources of the online transaction, and then returns, from a first system account at the third-party payment platform to the buyer's user account, the requested resource (which is money in the present transaction) equivalent in value to the resource associated with the identified online transaction.

At block 408, the seller processes the counterpart resource of the online transaction returned from the buyer. The counterpart resource may be a product purchased by the buyer from the seller in the online transaction. Upon receiving the returned product from the buyer, if the seller agrees to accept the buyer's request for resource return (refund), the seller submits to the trading server a message confirming resource return, and the process proceeds to block 410. But if the seller rejects the buyer's request for resource return, the seller may send to the trading server a message rejecting the request for resource return, and may also include in the message any information of buyer's bad-faith conduct. In this case, the process proceeds to block 409.

At block 409, upon receiving from the seller a message rejecting resource return along with the information indicating the existence of the buyer's past bad-faith conduct, the trading server writes the user identifier of the buyer into the blacklist barring from expedited resource return, and ends the process.

At block 410, the trading server receives from the seller the message confirming resource return. The message carries the transaction identifier of the online transaction.

At block 411, the trading server sends to the third-party payment platform an instruction confirming expedited resource return. The instruction carries the transaction identifier of the online transaction identified in the seller's message confirming resource return.

At block 412, the third-party payment platform receives the instruction confirming expedited resource return.

At block 413, the third party payment platform determines if the transaction identifier in the instruction confirming expedited resource return matches the transaction identifier in the earlier instruction for expedited resource return. If the result is yes, the third-party payment platform returns, from a second system account to the first system account, the requested resource equivalent in value to the trading resource associated with the identified online transaction. The process ends.

In the above process, upon receiving a request for expedited resource return from the buyer, the trading server is able to instruct the third-party payment platform to quickly make a refund to the buyer without waiting for the seller to have first received the returned product from the buyer.

The above-described techniques may be implemented with the help of one or more non-transitory computer-readable media containing computer-executable instructions. The non-transitory computer-executable instructions enable a computer processor to perform actions in accordance with the techniques described herein. It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

In connection to the method disclosed herein, the present disclosure also provides a computer-based apparatus for processing online transactions.

In the presence disclosure, a "module" in general refers to a functionality designed to perform a particular task or function. A module can be a piece of hardware, software, a plan or scheme, or a combination thereof, for effectuating a purpose associated with the particular task or function. In addition, delineation of separate modules does not necessarily suggest that physically separate devices are used. Instead, the delineation may be only functional, and the functions of several modules may be performed by a single combined device or component. When used in a computer-based system, regular computer components such as a processor, a storage and memory may be programmed to function as one or more modules to perform the various respective functions.

FIG. 5 shows an example of a computer-based apparatus, specifically a server system 500 which has one or more processor(s) 590, I/O devices 592, computer-readable memory and storage medium 594 which stores application program(s) 580.

The server system 500 is programmed to have functional modules including:

a receiving module 501 configured to receive from a first user a request for a preferential return of a trading resource associated with a prior online trade;

an acquiring module 502 configured to obtain user information of the first user;

a first determining module 503 configured to determine a user rating of the first user based on the acquired user information;

a comparison module 504 connected to the first determining module 503 and configured to determine whether a user condition of the first user meets a preset user condition criterion, wherein the comparison module 504 determines at least whether the user rating is greater than or equal to the preset user rating threshold; and a payment module 505 configured to disburse to the first user the trading resource according to the request if the user condition meets the preset user condition criterion.

As described herein, in addition to the user rating, the comparison module 504 may be used to determine whether one or a combination of a variety of user conditions meet the present user condition criterion for a preferential resource return. The server system 500 may be programmed to carry out operations of the processes described herein with FIGS. 1-4.

FIG. 6 shows another example of a computer-based apparatus, specifically a server system 600 which has one or more processor(s) 690, I/O devices 692, computer-readable memory and storage medium 694 which stores application program(s) 680.

The server system 600 is programmed to have functional modules including several modules similar to that found in server system 500, specifically a receiving module 601, similar to the receiving module 501; an acquiring module 602 similar to the acquiring module 502; a first determining module 603 similar to the first determining module 503; a comparison module 604 similar to the comparison module 504; and a payment module 605 similar to the payment module 505.

The server system 600 is programmed to have additional functional modules including a second determining module 606, a third determining module 607, a decision module 608, a blacklist module 609, and a forth determining module 610.

It is noted that the determining modules 603, 606, 607, and 610, the decision module 608, and the comparison module 604 may perform either separate or combined functions. One or any combination of these modules may be used to accomplish a process with regard to one or more conditions of the first user to determine if the first user and the request of the first user are qualified for a preferential or expedited resource return.

In this embodiment, the receiving module 601 is further configured to receive from the second user a message confirming the preferential resource return, or a message indicating a record of the first user's bad-faith conduct in the past. In this regard, blacklist module 609 is preferably connected to the receiving module 601, and is configured to compile a blacklist for preferential resource return based on the information received from the receiving module 601, including records related to the first user's identity and behavioral history, especially online shopping related behavioral history, such as records of online shopping fraud, blacklist of online shopping payment, blacklist of online shopping complaints, and blacklist of online trading misconduct. For example, if the receiving module 601 has received from the second user a message indicating past bad-faith conduct by the first user, the blacklist module 609 may write the user identifier of the first user into the blacklist.

The decision module 608 is connected to the blacklist module 609 to determine whether the use identifier of the first user is found in the blacklist compiled by the blacklist module 609. The decision module 608 may be further connected to any of the determining modules 603, 606, 607 and 610 and comparison module 604 to make a decision either parallel or in serial to the results of the connected modules.

The second determining module 606 is configured to determine a credit resource of the first user using a method described herein. In one embodiment, the second determining module 606 is connected to the decision module 608, such that the second determining module 606 determines the credit source of the first user after the decision module 608 has decided that the use identifier of the first user is not found in the blacklist compiled by the blacklist module 609.

The third determining module 607 is configured to determine a currently available credit resource of the first user using a method described herein. In one embodiment, the third determining module 607 is connected to the second determining module 606, such that the third determining module 607 determines the currently available credit resource of the first user after the second determining module 606 has determined that the first user's credit resource is greater in value or at least equal to the resource requested to be returned by the first user.

The fourth determining module 610 determines if the present process for preferential resource return requested by the first user has been successfully completed. In one embodiment, the fourth determining module 610 is connected to the receiving module 601. As the receiver module 601 receives from the second user a message confirming the preferential resource return, the fourth determining module 610 decides that the present process for preferential resource return is complete.

In one embodiment, the second determining module 606 is connected to the first determining module 603 and the comparison module 604 such that as the comparison module 604 has determined, based on the results of the second determining module 606, that the resource requested to be returned is smaller in value than the credit resource of the first user, the payment module 605 then returns the requested resource by making a refund to the first user.

In one embodiment, the second determining module 606 is connected to the decision module 608 such that the second determining module 606 determines that credit resource of the first user after the decision module 608 has determined that the use identifier of the first user is not found in the blacklist.

In one embodiment, the third determining module 607 is connected to the second determining module 606 and the comparison module 604 such that the payment module 605 returns the requested resource to the first user if the comparison module 604 has determined that the resource associated with the prior online transaction is smaller in value or equal to the currently available credit resource of the first user.

In summary, according to the present disclosure, when the first user needs to request for a return of a resource associated with a prior online trade, the trading server may decide to return the requested resource to the first user's account immediately upon determining that the first user and the prior online trade meet the conditions required for a preferential or expedited resource return, without waiting for the second user to have received the returned counterpart resource. This increases the speed of returning resources associated in online trading, reduces the frequency of account refreshing by the first user, and lightens the processing burden on the system.

It is appreciated that the potential benefits and advantages discussed herein are not to be construed as a limitation or restriction to the scope of the appended claims.

Finally, it should be pointed out that any relational terms such as "first" and "second" in this document are only meant to distinguish one entity from another entity or one operation from another operation, but not necessarily request or imply existence 10 of any real-world relationship or ordering between these entities or operations. Moreover, it is intended that terms such as "include", "have" or any other variants cover non-exclusively "comprising". Therefore, processes, methods, articles or devices which individually include a collection of features may not only be including those features, but may also include other features that are not listed, or any inherent features of these processes, methods, articles or devices. Without any further limitation, a feature defined within the phrase "include a . . . " does not exclude the possibility that process, method, article or device that recites the feature may have other equivalent features.

Methods and servers of displaying search result data have been described in the present disclosure in detail above.

Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skills in the art may modify the exemplary embodiments and application fields. All in all, contents in the present disclosure should not be construed as limitations to the present disclosure.

What is claimed is:

1. A method for returning trading resources in a way which reduces computer's processing resources, the method comprising:
    in association with an online transaction involving a first trading resource being exchanged for a second trading resource, receiving a request from a first user to have the first trading resource returned to the first user in exchange for the first user returning the second trading resource;
    acquiring user information of the first user;
    determining a user rating of the first user based on the acquired user information;
    determining that a user condition of the first user meets a preset user condition criterion, the determining including at least determining that the user rating is greater than or equal to a preset user rating threshold and determining that the first trading resource requested to be returned is smaller than a credit resource of the first user; and
    in response to determining that the user condition of the first user meets the preset user condition criterion, returning to the first user the first trading resource prior to the second user receiving the second trading resource that is from the first user.

2. The method of claim 1, wherein the user information of the first user comprises a behavior parameter of the first user, wherein the behavior parameter includes at least one of a plurality of types including: online shopping records, complaints, records of resource returning, user category, user reviews, and online shopping fraud records.

3. The method of claim 2, wherein determining the user rating of the first user comprises:
    quantifying a score of each type of the behavior parameter using predetermined quantization levels;
    obtaining a weighted value of the score of each type of the behavior parameter by multiplying the score with a respective weight factor corresponding to the respective type of the behavior parameter; and
    computing the user rating by summing up the weighted value of the score of each type of the behavior parameter.

4. The method of claim 1, further comprising determining the credit resource of the first user, wherein determining the credit resource of the first user comprises:
    determining a user category of the first user based on the user rating, the user category being selected among present user categories; and
    obtaining the credit resource of the first user based on the determined user category.

5. The method of claim 1, wherein determining that the user condition of the first user meets the preset user condition criterion further comprises:
    determining an available credit resource of the first user; and
    determining that the first trading resource requested to be returned in the request is smaller than the available credit resource of the first user.

6. The method of claim 5, wherein determining the available credit resource of the first user comprises:
    determining a pre-assigned credit resource of the first user;
    determining whether a pending request for a preferential return of resource previously requested by the first user exists;
    determining an occupied resource caused by the pending request; and
    computing the available credit resource by subtracting the occupied resource from the pre-assigned credit resource.

7. The method of claim 1, wherein the determining that the user condition of the first user meets the preset user condition criterion further comprises determining that the first user is not included in a blacklist for a preferential return of the trading resources.

8. The method of claim 7, wherein determining that the user condition of the first user meets the preset user condition criterion further comprises determining the credit resource of the first user in response to determining that the first user is not included in the blacklist.

9. The method of claim 7, further comprising:
    compiling the blacklist for the preferential return of the trading resources by combining one or more records of: committing a fraudulent act related to online shopping, being listed in a blacklist of online payment, being listed in a blacklist of online shopping complaints, and being listed in a blacklist of online trading misconduct.

10. The method of claim 1, further comprising:
    receiving a message from the second user indicating bad faith behavior of the first user; and
    writing a user identifier of the first user into a blacklist for a preferential return of the trading resources.

11. The method of claim 1, further comprising:
    receiving a message from the second user confirming a preferential return of the first trading resource; and
    confirming a successful completion of the request for the preferential return of the first trading resource.

12. The method of claim 1, wherein determining that the user condition of the first user meets the preset user condition criterion further comprises:
    determining a pre-assigned credit resource of the first user;
    determining whether a pending request for a preferential return of resource previously requested by the first user exists;
    determining an occupied resource caused by the pending request;
    determining an available credit resource by subtracting the occupied resource from the pre-assigned credit resource; and
    determining that the first trading resource requested to be returned in the request is smaller than the available credit resource of the first user.

13. The method of claim 12, wherein determining that the user condition of the first user meets the preset user condition criterion further comprises determining that the first user is not included in a blacklist for a preferential return of the trading resources.

14. A system for returning trading resources in a way which reduces computer's processing resources, the system comprising:
    one or more processors;
    memory storing executable instructions that, when executed by the one or more processors, cause the one or more processors to perform acts comprising;

in association with an online transaction involving a first trading resource being exchanged for a second trading resource, receiving a request from a first user to have the first trading resource returned to the first user in exchange for the first user returning the second trading resource;

acquiring user information of the first user;

determining a user rating of the first user based on the acquired user information;

determining that a user condition of the first user meets a preset user condition criterion, the determining including at least determining that the user rating is greater than or equal to a preset user rating threshold and determining that the first trading resource requested to be returned is smaller than a credit resource of the first user; and in response to determining that the user condition of the first user meets the preset user condition criterion, returning to the first user the first trading resource prior to the second user receiving the second trading resource that is from the first user.

15. The system of claim 14, wherein the user information of the first user comprises a behavior parameter of the first user, wherein the behavior parameter includes at least one of a plurality of types including: online shopping records, complaints, records of resource returning, user category, user reviews, and online shopping fraud records.

16. The system of claim 15, wherein determining the user rating of the first user comprises:

quantifying a score of each type of the behavior parameter using predetermined quantization levels;

obtaining a weighted value of the score of each type of the behavior parameter by multiplying the score with a respective weight factor corresponding to the respective type of the behavior parameter; and computing the user rating by summing up the weighted value of the score of each type of the behavior parameter.

17. The system of claim 14, the acts further comprising determining the credit resource of the first user, wherein determining the credit resource of the first user comprises:

determining a user category of the first user based on the user rating, the user category being selected among present user categories; and obtaining the credit resource of the first user based on the determined user category.

18. The system of claim 14, the acts further comprising:

receiving a message from the second user indicating bad faith behavior of the first user; and writing a user identifier of the first user into a blacklist for a preferential return of the trading resources.

19. One or more transitory media storing executable instructions that, when executed by one or more processors, cause the one or more processors to perform a method for returning trading resources in a way which reduces computer's processing resources, wherein the method comprises:

in association with an online transaction involving a first trading resource being exchanged for a second trading resource, receiving a request from a first user to have the first trading resource returned to the first user in exchange for the first user returning the second trading resource;

acquiring user information of the first user;

determining a user rating of the first user based on the acquired user information;

determining that a user condition of the first user meets a preset user condition criterion, the determining including at least determining that the user rating is greater than or equal to a preset user rating threshold and determining that the first trading resource requested to be returned is smaller than a credit resource of the first user; and in response to determining that the user condition of the first user meets the preset user condition criterion, returning to the first user the first trading resource prior to the second user receiving the second trading resource that is from the first user.

* * * * *